Feb. 7, 1967
A. HAMBURGEN
ERROR DETECTION AND CORRECTION APPARATUS
FOR CHARACTER READERS
Filed March 4, 1963
3,303,463
7 Sheets-Sheet 1

INVENTOR
ARTHUR HAMBURGEN
BY Paul D. Carmichael
ATTORNEY

Feb. 7, 1967 A. HAMBURGEN 3,303,463

ERROR DETECTION AND CORRECTION APPARATUS FOR CHARACTER READERS

Filed March 4, 1963 7 Sheets-Sheet 2

Feb. 7, 1967 A. HAMBURGEN 3,303,463

ERROR DETECTION AND CORRECTION APPARATUS FOR CHARACTER READERS

Filed March 4, 1963 7 Sheets-Sheet 3

Feb. 7, 1967 A. HAMBURGEN 3,303,463

ERROR DETECTION AND CORRECTION APPARATUS FOR CHARACTER READERS

Filed March 4, 1963 7 Sheets-Sheet 5

Feb. 7, 1967 A. HAMBURGEN 3,303,463

ERROR DETECTION AND CORRECTION APPARATUS FOR CHARACTER READERS

Filed March 4, 1963 7 Sheets-Sheet 6

Feb. 7, 1967 A. HAMBURGEN 3,303,463

ERROR DETECTION AND CORRECTION APPARATUS FOR CHARACTER READERS

Filed March 4, 1963 7 Sheets-Sheet 7

3,303,463

ERROR DETECTION AND CORRECTION APPARATUS FOR CHARACTER READERS

Arthur Hamburgen, Belmont, Mass., assignor to International Business Machines Corporation, New York, N.Y., a corporation of New York Filed Mar. 4, 1963, Ser. No. 262,417
10 Claims. (Cl. 340—146.1)

The present invention relates generally to the electronic and computer arts and more particularly to error detection and correction apparatus for use in conjunction with character readers or the like.

Systems have previously been developed and are in use for reading and recognizing human language symbols or characters printed or otherwise formed on documents. Electrical signals corresponding to the characters on the documents are produced and supplied to a digital computer for further processing or used to actuate an output device, such as a document sorter, card punch or printer. In many of the applications for character readers, one of the primary requirements is that the characters be read and recognized with a high degree of accuracy. For example, if checks are being read and the amounts debited against account numbers on the basis of account numbers read, erroneous recognition of one or more digits of an account number may result in the amount being debited against the wrong account.

The requirement that accurate data be supplied by character readers has long been recognized in the art, and the recognition means of the readers are usually optimized in a manner which will eliminate a greater portion of the reading errors. However, some of the conditions which contribute to the failure of character readers to correctly recognize characters, particularly variations in the printing quality of the characters on the source documents, are not under the control of the machine designer. For example, some of the characters will have voids or areas where character information should be present but is absent. Under these conditions, the character 8 could readily be recognized as the character 3. Other characters will have noise or extraneous information in the scanned character area due to defects in the documents, ink splatter or the like.

It has previously been suggested to include error detection apparatus in character readers. Error checking schemes of the type usually employed with character readers are based on the concept of including a redundant check character with a number of characters so that the entire group of characters, including the check character, satisfies an arithmetical checking formula. In my copending patent application, Serial No. 45,499, filed July 26, 1960, entitled "Error Detection and Correction System," now U.S. Patent 3,200,372, issued August 10, 1965, which is assigned to the assignee of the present invention, there is disclosed apparatus capable of determining not only whether the arithmetical checking formula has been satisfied but also correcting a group of characters when the formula has not been satisfied where one and only one of the characters has not been recognized. While these error detection and correction schemes operate in the manner intended, they are not capable of correcting a group of characters having a single check character associated therewith where two or more characters of the group are not recognized. Further, the schemes cannot detect errors in groups of characters having two or more compensating errors therein which cause such character groups to satisfy the checking formula.

Briefly, the present invention is concerned with the provision of error detection and correction apparatus for character readers wherein it is possible to correct a group of characters having a single check character associated therewith when one or more than one of the characters are not recognized. The error detection and correction apparatus also provides a means for detecting the character groups wherein the most probable compensating errors have occurred. This means allows the apparatus to correct a greater portion of the character groups wherein more than one character has not been recognized.

Before outlining the objects and proceeding with a detailed description of a preferred embodiment of the invention, the various types of outputs provided by a character reader when a character is not recognized will be considered. A "failure to recognize" condition exists when it is known that a character has been scanned and the character cannot be identified. The information supplied from the scanning means is insufficient to even partially satisfy the recognition requirements for any of the characters to be identified, and the character reader provides a signal indicating this failure. In most cases, there will be sufficient information provided by the scanning means to partially satisfy the recognition requirements for more than one character and the character reader will supply outputs indicating each of these characters. For example, the character reader may read the character 7 and provide output indications that the read character was either a 7 or a 2. This is known as an "uncertainty" or "conflict" condition. It should be noted that when an uncertainty exists, the correct character is usually one of the characters identified by the output signals from the character reader. The term "substitution" is used to designate the condition where the read character is definitely recognized as another character. The example cited above where the character 8 is read and the character reader provides an output indicating the character 3 has been recognized illustrates this condition.

It is the primary or ultimate object of this invention to provide error detection and correction apparatus for use with a character reader or the like which greatly improves the accuracy and operation of the character reader. The apparatus is capable of correcting groups of characters having a single redundant check character associated therewith which could not heretofore be corrected and of minimizing the occurrence of undetectable and/or uncorrectable error conditions. The arrangement is such that the character reader provides highly accurate information to its associated output device and the scope of applications for character readers is expanded.

Another object of the invention is to provide error detection and correction apparatus for use with a character reader or the like wherein a group of characters having a check character associated therewith may be corrected when multiple uncertainties occur in the character group. Apparatus is provided which allows the formation of all possible character group combinations when multiple uncertainties are encountered to determine which combination will satisfy the arithmetical checking formula. If one and only one of the possible combinations will satisfy the checking formula, then this is the correct group and is supplied to the output device.

Yet another object of the invention is to provide error detection and correction apparatus of the type and for the purposes set forth above which comprises novel circuit means for determining which of the possible character group combinations will satisfy the checking formula. An uncertainty buffer receives and stores the possible characters for each uncertainty in a character group along with a value determined from the correctly read characters of the group. The uncertainty buffer is operative to shift and interchange the characters provided for each uncertainty in such a manner that all possible combinations thereof can be supplied to adder means to determine which, if any, character group combination satisfies the checking formula.

A further object of the invention is to provide error detection and correction apparatus for a character reader or the like where the occurrence of multiple compensating uncertainty and/or substitution errors in a group of characters which will satisfy the checking formula is substantially reduced and minimized. For a character reader in a given application, it is possible to determine by testing the probabilities that a known character will be recognized as another character and/or the characters which are most likely to be indicated for the read character under uncertainty conditions. This information can be assembled for all of the characters and probability matrices constructed. Examination of the matrices in view of the error checking scheme employed permits one or more characters to be handled as different characters internally of and within the confines of the error detection and correction apparatus. As will be hereinafter more fully explained, the designation of one character as another character within the error detection and correction apparatus does not affect the over-all operation of the character reading system, although the check character may have a different value, but does substantially reduce the probability of multiple compensating errors which cannot be detected and/or corrected by the error detection and correction apparatus.

The foregoing and other objects, features and advantages of the invention will be apparent from the following more particular description of a preferred embodiment of the invention, as illustrated in the accompany drawings.

Figures 1, 3:
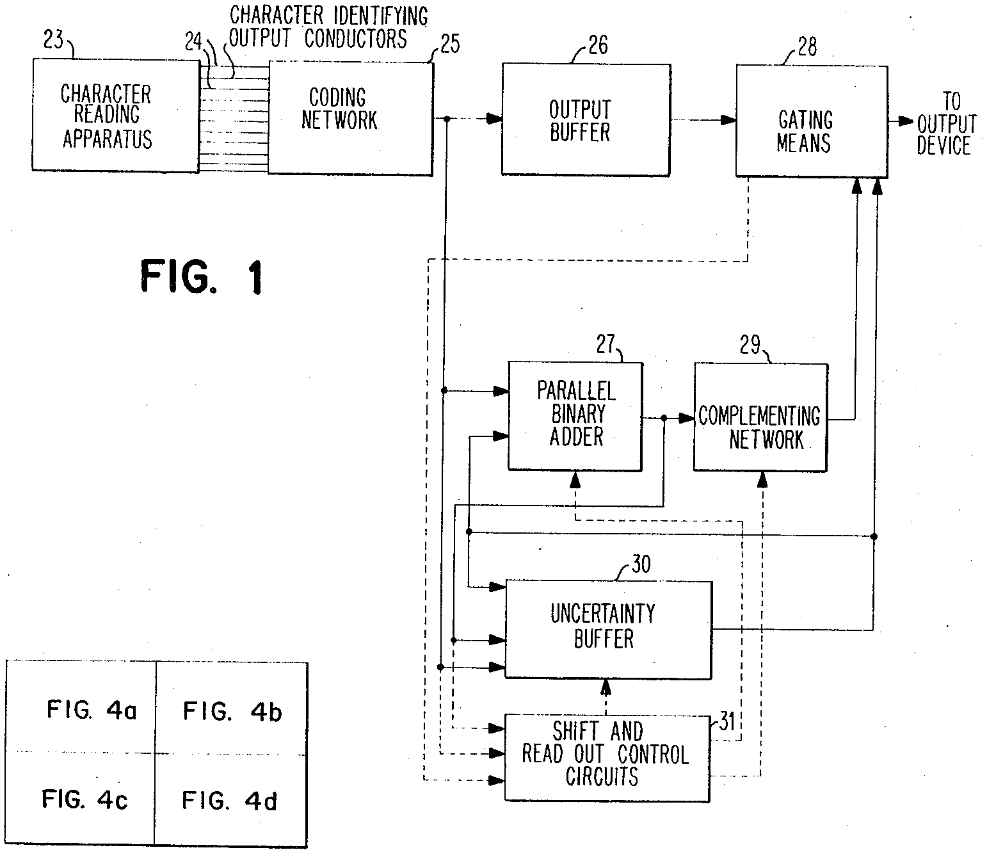
FIGURE 1 is a block diagram showing the main interconnections of the functional circuit groupings of error detection and correction apparatus constructed in accordance with and embodying the teachings of the present invention employed in conjunction with a character reader.
FIGURE 3 illustrates the manner in which the sheets of the drawings comprising FIGURES *4a–4d* are arranged so that the various circuits are interconnected.
Figure 4A:
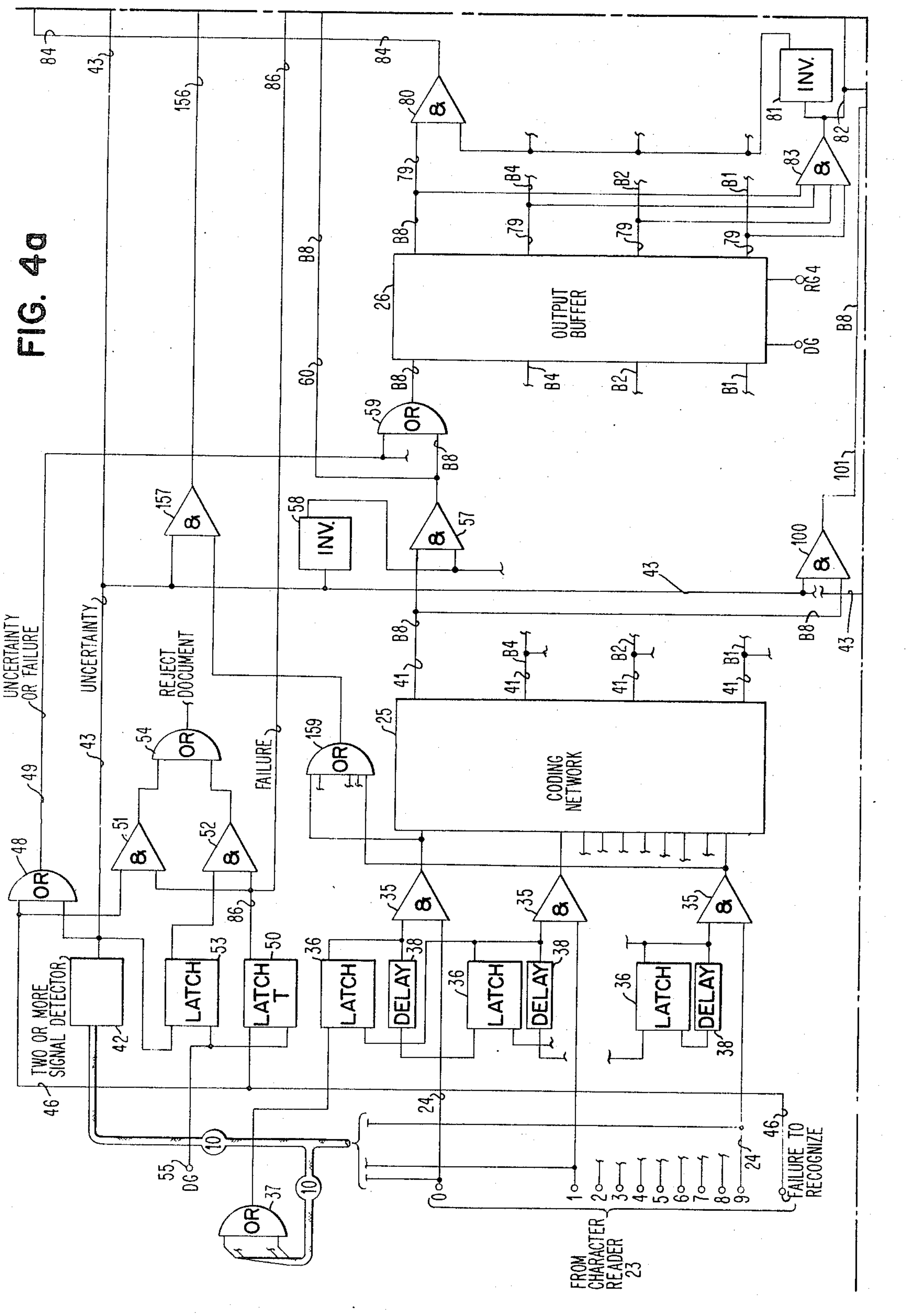
Figure 4B:
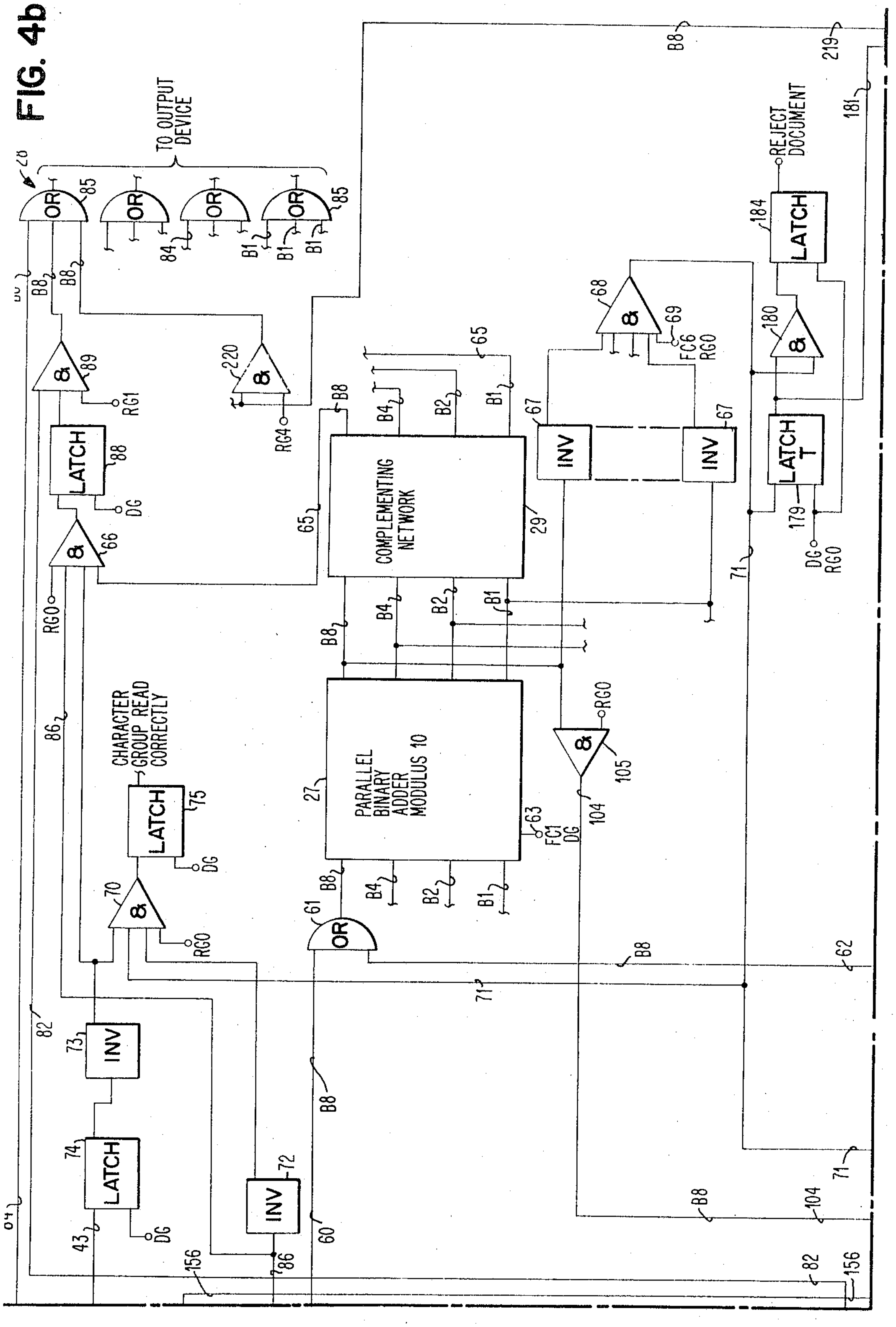
Figures 4C, 8:
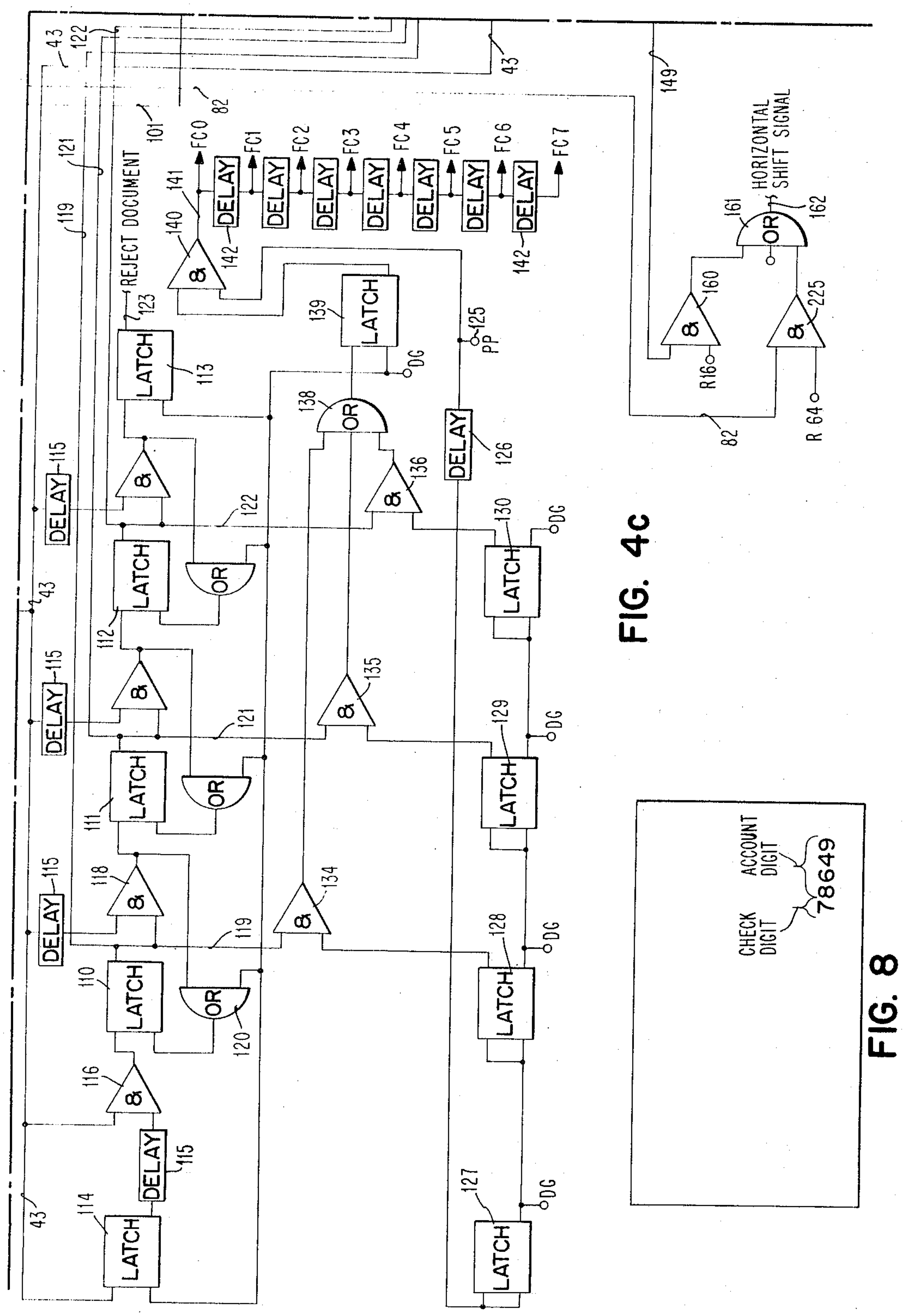
Figure 5:
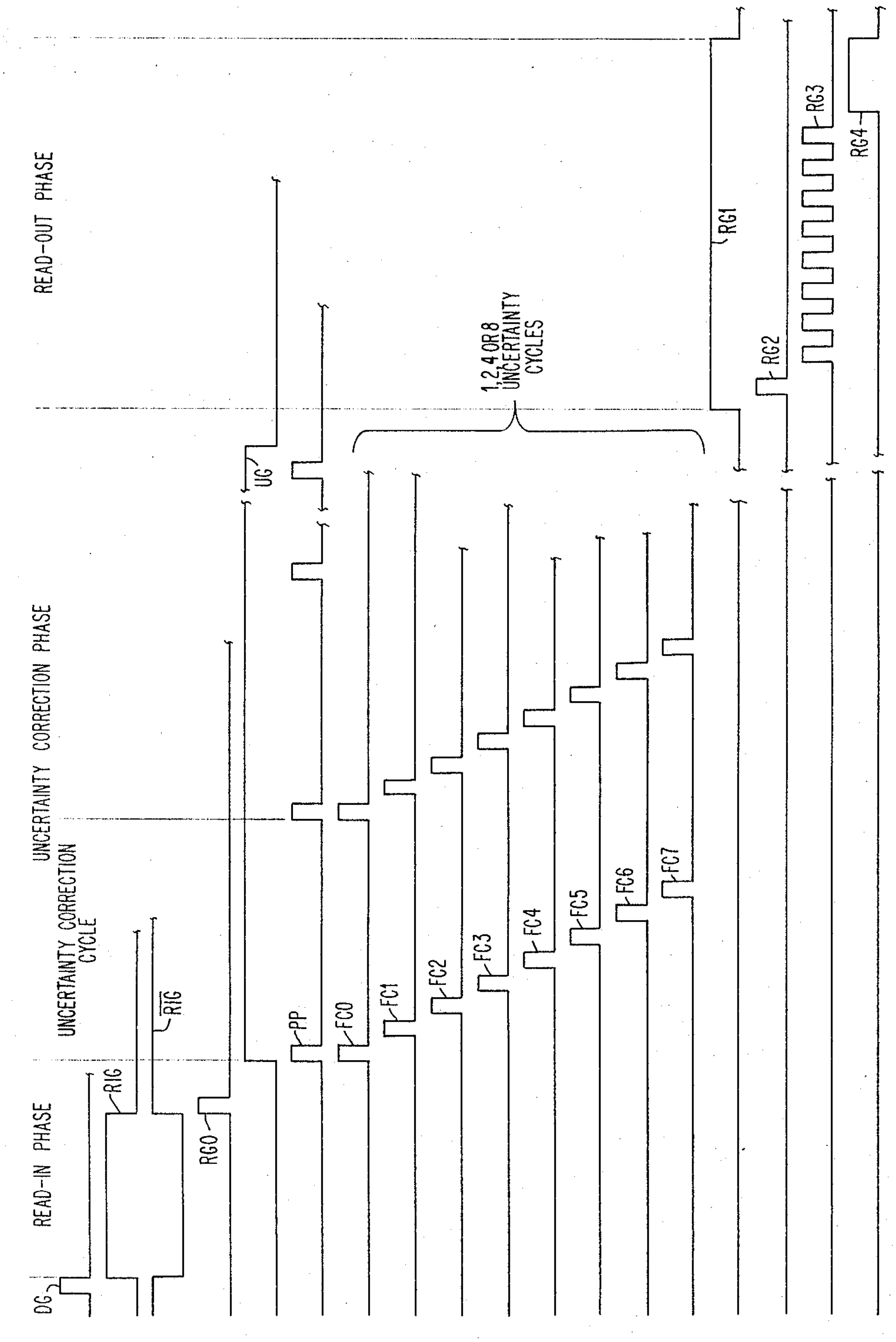
Figure 7:
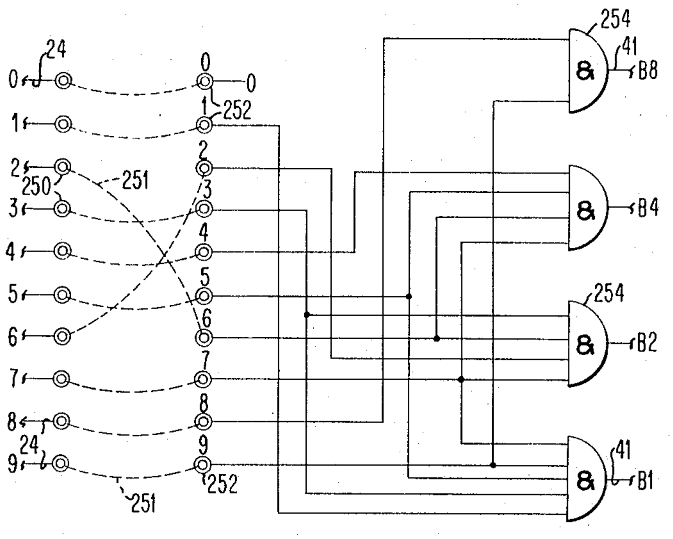
Figure 6:
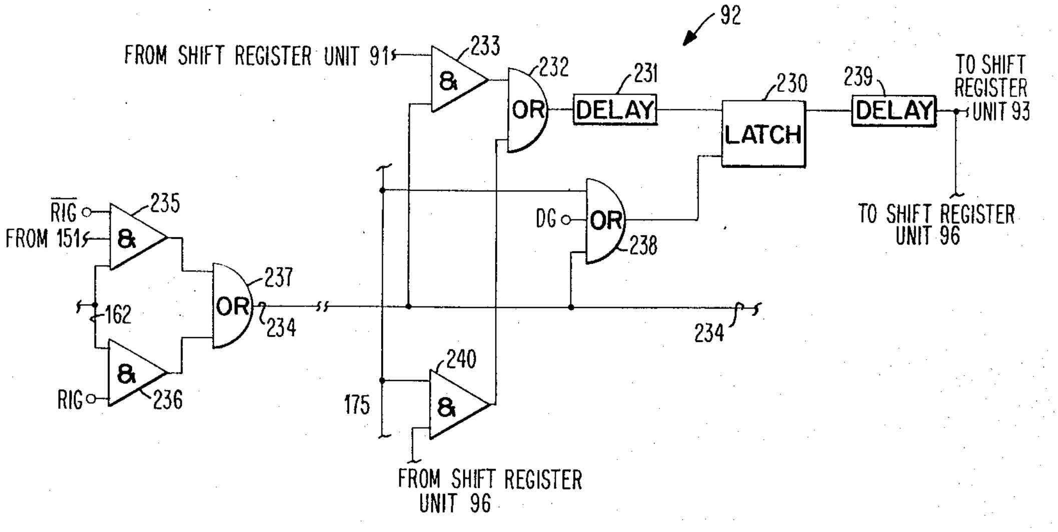

FIGURES *4a–4d*, taken together, are a schematic logic block diagram of the error detection and correction apparatus shown in FIGURE 1 of the drawings;

FIGURE 5 is a timing chart showing the various timing signals generated and employed in the error detection and correction apparatus of FIGURES *4a–4d*;

FIGURE 6 is a detailed logic block diagram of one of the shift register units of the uncertainty buffer employed in FIGURES *4a–4d*;

FIGURE 7 is a circuit diagram of the coding network described in connection with FIGURE 1 of the drawings with changes made therein to minimize the occurrence of multiple compensating uncertainty and/or substitution errors; and FIGURE 8 is a plan view of a document having a character group, including a redundant check character, printed thereon where the check character is compatible for use with error detection and correction apparatus embodying the coding network shown in FIGURE 7.

*Error checking scheme*

Figure 2:
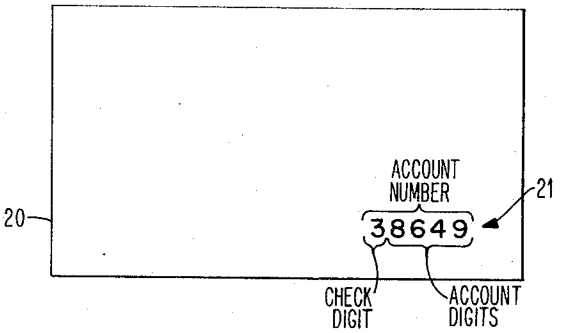
FIGURE 2 is a plan view of a document having a character group, including a redundant check character, printed of otherwise formed thereon.

Before proceeding with the description of the error detection and correction circuitry, it is necessary to consider the checking scheme employed. FIGURE 2 of the drawings shows a document 20 on which is printed or otherwise formed a group of characters 21 representing, for example, an account number which is to be read by a character reader. Signals corresponding to the characters of the account number are to be supplied to an output device. The account number comprises five characters, four of which are account digits. The remaining character is a redundant check digit. In the illustrated case, the account digits are the characters 8649 while the check digit is the character 3.

The check digit is selected so that it and the other digits in the account number satisfy an arithmetic checking formula. In the preferred embodiment, the sum of the values of all of the digits of the account number, including the check digit, is equal to a selected numeric modulus or an integral mutiple thereof. The selected numeric modulus in the illustrated embodiment is 10 so that the check digit 3 when added to the sum of the values of the account digits ($8+6+4+9=27$) equals 30 which is an integral multiple of the modulus 10. The characters on the source document 20 are read by the character reader and the values of the recognized characters are added together to determine whether the arithmetical checking formula is satisfied. If the checking formula is not satisfied, then the read account number is corrected or, if correction cannot be accomplished, the document is rejected and information concerning the same is not accepted by the output device.

It should be understood that while a particular checking scheme is employed for purposes of illustration in this specification, the teachings of the invention are not limited to this checking scheme. In certain applications the selected numeric modulus may be larger or smaller than 10. While the modulus 10 is quite convenient for checking the ten numerical characters 0–9, a modulus of 36 would be preferable where 26 alphabetic and 10 numerical characters are to be identified. Each of the alphabetic characters would have a numerical value for checking purposes. If transposition errors are likely to occur at any stage in the data processing operation, such as during the typing of account numbers on the documents, then a checking scheme of the type disclosed in U.S. Patent No. 2,731,196 to H. P. Luhn, which is assigned to the assignee of the present invention, might be employed. The specific implementation of the detection and correction apparatus will usually depend upon the checking scheme employed as will be understood by those skilled in the art.

The account number in the illustrated embodiment is shown to comprise a total of five digits. A character group to be checked may include many more digits depending on the particular application. Further, more than one group of characters to be checked can appear on the same document, and it is possible to locate the check digits on the document in spaced relation with respect to the associated information digits of the character groups. Those desiring more information concerning such arrangements should make reference to my above-mentioned U.S. Patent 3,200,372.

*General operation*

The over-all operation of the error detection and correction apparatus is such that for each character group having a redundant check character associated therewith, the outputs of the character reader are examined to determine whether the arithmetic checking formula is satisfied. If the checking formula is not satisfied, then the document is rejected, or under most error conditions, the read character group is corrected and accepted by the output device. The error detection and correction apparatus is operative to correct a character group having one or more than one uncertainty therein. Further, as will be later explained, means are provided for minimizing the occurrence of compensating errors in a character group which cannot be detected and/or corrected.

Referring now to FIGURE 1 of the drawings, a character reader 23 scans or reads the characters 21 on the source document 20 in serial fashion and provides signals on digit identifying output conductors 24 which are supplied to a coding network 25. There is an output conductor 24 for each character of the group to be recognized and one additional conductor which indicates failure to recognize a read character. When an uncertainty condition is encountered, the character reader will provide two or more output signals over conductors 24 at the same time. A typical character reader of the type which will provide such output signals is disclosed in the co-pending patent application of Evon C. Greanias and William W. Hardin, Serial No. 704,396, filed December 23, 1957, entitled, "Character Recognition System," now U.S. Patent 3,140,466, issued July 7, 1964, which is assigned to the assignee of the present invention.

The coding network 25 performs a translation function in that each signal on the conductors 24 is transformed into a binary representation corresponding to the character identified by the signal. The binary signals representing a recognized character are transferred in parallel to an output buffer 26 performing a temporary storage function and to a parallel binary adder 27. The adder 27 accumulates the parallel binary signals supplied thereto and is connected to return to a selected condition each time a value equal to the selected numeric modulus of the checking scheme is reached. If all characters of a character group, including the redundant check character, have been correctly recognized, the sum in the adder will be the selected condition. This signifies that the checking formula is satisfied, and the character group in the output buffer 26 is transmitted via gating means 28 to an output device, not particularly shown.

If a character group is read and a single failure condition detected, a special binary code group is placed in the character position in the output buffer 26 corresponding to the unrecognized character. The parallel binary adder 27 will have a sum therein other than the selected condition after the reading of the character group, and this sum is complemented with respect to the selected numeric modulus by complementing network 29 to provide the value of the missing character. The value of the missing character is inserted in the correct character position as the information in the output buffer 26 is transmitted via gating means 28 to the output device.

Considering now the general operation of the error detection and correction apparatus in correcting multiple uncertainties, it will be assumed for the illustrated account number (38649) uncertainties exist with respect to the characters 9 and 6. The character reader provides signals indicating that the first character to be read is either a 1 or a 9, and the character in the third character position from the right is either a 6 or an 8. The information provided by the character reader 23 under these conditions can be summarized as follows:

```
  6        1
38 or    4 or
  8        9
```

The binary representations of the recognized characters 4, 8, and 3 are supplied to the output buffer 26 along with binary code groups indicating uncertainties in the first and third character positions. The binary representations of the recognized characters are also supplied to the binary adder 27, while the binary representations of the two possible characters for each uncertainty character position are transmitted to and stored in an uncertainty buffer 30. After the entire character group has been read, the binary sum remaining in the adder is transferred to the uncertainty buffer 30. In the illustrated case, this sum would have a value of 5 since the sum of the recognized characters (4, 8, and 3) equals 15. During an error correction operation, the uncertainty buffer 30, under the control of shift and readout control circuits 31, supplies all possible combinations of the information therein—the binary representations of the uncertainty characters and the initial binary sum from the adder—to the adder 27. The uncertainty buffer is a two dimensional shift register with the primary stages thereof forming rows to provide parallel channels along which information can be propagated. At least one of the primary stages in each row is interconnected with a primary stage in another row to permit the exchange of information therebetween. Each of the possible combinations of the information in the uncertainty buffer is supplied to the adder, and the adder is tested after each calculation to determine whether the sum equals the preselected condition. The shift and read-out control circuits 31 record the number of uncertainties occurring in a character group and control the circulation of the information between the uncertainty buffer and adder in accordance therewith.

For the example set forth above, the possible combinations of the information in the uncertainty buffer 30 and the resultant sums in the adder 27 at the end of each uncertainty cycle are listed below:

$$5+8+9=2$$
$$5+6+1=2$$
$$5+6+9=0$$
$$5+8+1=4$$

The third combination indicates that the correct characters for the uncertainty character positions are 6 and 9 since this combination satisfies the arithmetical checking formula. The control circuits 31 remember which of the possible combinations caused the sum in the adder to equal the preselected condition, and at the end of all of the uncertainty cycles, returns the information in the uncertainty buffer to that configuration. The binary representations of the correct characters are then placed in their associated uncertainty character positions as the information in the output buffer 26 is supplied to the output device via gating means 28. If two or more of the possible combinations of the information in the uncertainty buffer caused the adder to have a sum equal to the preselected condition or if none of the possible combinations caused the adder to assume this condition during the uncertainty cycles, then the document is rejected.

The apparatus employed for minimizing the occurrence of multiple compensating uncertainty and/or substitution conditions will be discussed more fully in a following section of this specification. However, it is appropriate to note at this time that the ability to minimize such compensating and undetectable errors coupled with the correction of multiple uncertainties greatly improves the over-all accuracy and reliability of a character reading system.

*Correcting multiple uncertainties in a character group*

Before referring to the schematic circuit diagrams of the drawings, the symbols employed to indicate standard and well-known logical circuits will be defined. The triangular shaped symbol with an "&" therein represents an AND logic block which performs Boolean multiplication in that each input signal must be at the binary one level before the output signal goes to the binary one level. The semicircular symbols are OR logic blocks performing Boolean addition. A binary one signal on any input conductor will cause a corresponding output signal. The rectangular blocks containing the designation "INV." are inverters so that a signal applied to the input representing one binary level will cause a signal representing the other binary level to appear at the output.

The word "LATCH" in a block designates a binary storage device having two stable states. The leading edge of a signal going to the binary one level applied over the set or upper input conductor causes a latch to be set and assume a state whereby a signal at the binary one level is produced on the set or upper output conductor and a signal corresponding to the binary zero is produced on the reset or lower output conductor. Subsequent signals going to the binary one level applied over the set input conductor will not alter the state of the latch. A signal going to the binary one level applied over the reset or lower input conductor will return the latch to its initial state so that signals corresponding to the binary zero and one levels are provided on the set and reset output conductors, respectively. The additional letter T in a latch block indicates that the same is set and reset by the trailing edges of input signals rather than by the leading edges thereof. A latch can be connected to perform as a modulus 2 or binary counting element by applying the same input signals over the set and reset input conductors. In this case, the initial condition of the latch is determined by the application of pulse type signals to either the set or reset output conductors.

The internal construction and operation of the above-described logic elements is well known to persons skilled in the electronic and computer arts and will not be described. However, those desiring further information concerning representative circuits may make reference to the "IBM Customer Engineering Manual of Instruction—Transistor Component Circuits," published in 1961 by International Business Machines Corporation, 590 Madison Avenue, New York, New York.

As shown in FIGURE 4*a* of the drawings, a character identifying output conductor 24 extending from the character reader 23 is provided for each character of the group of characters to be recognized. When a character is scanned and recognized by the character reader, a signal will appear on the corresponding character identifying output conductor. In the case of an uncertainty or conflict condition, signals are present at the same time on more than one of the output conductors. Each of the output conductors 24 is connected to an AND block 35 whose other input is supplied over the set output conductor of an associated latch 36.

The ten conductors 24 are also connected to OR block 37 which is energized by the first character identifying signal on the conductors 24 and applies a signal to the set input of latch 36 associated with the 0 character identifying output conductor. The output from this latch conditions its associated AND block 35 for energization if there is a signal on the 0 character identifying output conductor at this time. By way of delay device 38, the signal from this latch 36 also provides an input to the latch 36 associated with the 1 character identifying output conductor. After a time interval which is determined by delay device 38, the second latch 36 is set to allow any signal on the 1 character output conductor to energize the AND logic block 35 associated therewith. The setting of second latch 36 also causes the first latch 36 to return to its original state. The latches 36 define a progressing chain and provide for the sampling of the character identifying output conductors 24 in a successive and sequential manner for each character position in the character group read by the character reader.

The outputs of the ten AND blocks 35 are connected to the coding network 25 which performs a translation or conversion function. Extending from the coding network are four conductors 41 and signals on the character identifying output conductors 24 are translated into corresponding binary numbers in accordance with the following table:

| Character Identifying Output Leads 24 | Conductors 41 | | | |
|---|---|---|---|---|
| | B8 | B4 | B2 | B1 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

The conductors 41 are also designated by the reference indicia B1, B2, B4, and B8 in accordance with their corresponding decimal weightings. These indicia are used throughout FIGURE 4 of the drawings to designate conductors carrying binary signals of the same decimal weightings.

Each of the character identifying output conductors 24 is connected to a circuit 42 which provides an output signal when any two or more of the conductors 24 have signals thereon at the same time. The circuit 42 may comprise a magnetic core through which each of the character identifying output conductors 24 pass and is biased in such a manner that one signal on the conductors does not alter the state of the core. However, signals on two or more of the conductors at the same time cause the core to switch to a different magnetic state which produces a pulse at the binary one level on conductor 43. The core returns to its initial magnetic state whenever signals are not present simultaneously on at least two of the character identifying output conductors 24. The presence of a pulse on conductor 43 signifies that an uncertainty condition has occurred since the character reader has provided two or more character output indications or uncertainty characters for one character position of a character group.

An additional conductor 46 extends from the character reader 23 and has a signal thereon indicating a failure condition when a character has been read and cannot be recognized even to the extent of providing signals representing uncertainty characters on more than one of the character identifying output conductors 24. The failure signals on conductor 46 and the uncertainty signals on conductor 43 are supplied to OR block 48 so that the signals on conductor 49 represent the occurrence of an uncertainty or failure condition. The trailing edge of the first failure signal for a character group is used to set a latch 50 which in turn supplies one input to each of a pair of AND blocks 51 and 52. The remaining input to AND block 51 is the failure to identify signal on conductor 46 and an output signal is provided by this AND block when there are two failures in a character group. A latch 53 is set by the first uncertainty signal from the two or more signal detector 42 and provides the other input to AND block 52. The signals from AND blocks 51 and 52 are combined in OR block 54 whose output defines a reject signal. A document is rejected whenever two or more failures or an uncertainty and a failure occur in the same character group since these error conditions cannot be corrected with one check character. When a reject signal occurs at any time during an error detection and correction operation, the information relating to the entire character group coming from the error detection and correction apparatus is not accepted by the output device. The latches 50 and 53 are reset by a signal DG (see FIGURE 5) applied to terminal 55 which occurs before each error detection and correction operation.

The binary representations of the recognized characters of a character group appearing on conductors 41 are supplied to the output buffer 26 which performs a temporary storage function during error detection and correction operations. The four binary signals corresponding to each of the characters are transferred in parallel on data conductors B1, B2, B4, and B8 throughout FIGURE 4 of the drawings. For purposes of clarity in the drawings, various gating circuits are shown only in connection with the data conductors B8, but it is apparent that similar gating circuits are provided for each of the other data conductors B1, B2, and B4.

Each of the data conductors 41 leading from the coding network 25 defines one input to an AND block 57 whose other input is the inverted uncertainty signal supplied by inverter 58. The AND blocks 57 pass the information from the coding network 25 except when uncertainty conditions are detected. The output from each AND block 57 is transmitted to an OR block 59 whose other input is the uncertainty or failure signal appearing on conductor 49. The arrangement is such that the binary representation of each recognized character and a special binary code group (1111) for each uncertainty or failure character of a character group read by the character reader are provided to the output buffer 26 by the outputs of the four OR blocks 59.

The binary numbers coming from AND blocks 57 representing only the recognized characters of a character group are supplied via conductors 60 and OR blocks 61 to the input terminals of the parallel binary adder 27. The OR blocks 61 also receive data signals over conductors 62 from the uncertainty buffer 30 during the uncertainty correction phase in a manner to be further explained. The binary adder 27 accepts a binary number representing a recognized character during the read-in phase of an error detection and correction operation and adds the same to any sum remaining in the adder. The adder has the same modulus as the selected numeric modulus employed in the checking scheme—modulus 10 in the illustrated case. Each time a sum of ten is reached in the adder, the same is automatically recycled to zero. Thus, when the binary representations corresponding to the characters 4, 8, and 3 are supplied to the adder in serial fashion, the adder will have the binary sums 4, 2, and 5 therein after each consecutive add cycle. The adder is reset to zero at the beginning of a detection and correction operation and at the start of each uncertainty cycle by the timing signals DG and FC1 applied to reset terminal 63. The relative time of occurrence of the various timing signals is shown in FIGURE 5 of the drawings, and their generation will be explained in a following portion of the specification.

The sum accumulated by the binary adder appears on data conductors which lead directly to complementing network 29. The complementing network takes the tens complement of the output signals from the adder 27 and is of well-known construction. For example, if the binary representation of the number 9 is the sum in the adder, then data conductors 65 leading from the complementing network 29 will have binary signals corresponding to the number 1 thereon. The conductors 65 define one set of inputs to AND blocks 66 whose other inputs and functions will be later described.

As explained above, the arithmetical checking formula is satisfied, and the character group has been correctly read if the sum in the adder equals a selected condition after the binary representations of all of the characters in a character group, including the redundant check character, have been supplied thereto. The selected condition of the adder for the illustrated case is zero signifying that the sum of the character values is 10 or an integral multiple thereof. To determine whether the sum in the adder is zero, each of the conductors leading from the adder 27 is coupled to an inverter 67, and the four inverted signals are supplied to AND block 68. Since the adder may have a sum of zero therein at various times during the read-in phase of an error detection and correction operation, the AND block 68 is supplied with a timing or sampling signal RG0 applied to terminal 69. The timing signal RG0 occurs at the end of the read-in phase before the binary adder is reset by signal FC1. Since the adder is employed in each uncertainty cycle of the uncertainty correction phase of an error detection and correction operation, the sampling signal FC6 is supplied to terminal 69 during each uncertainty cycle to determine whether the adder has a sum of zero therein.

For a character group to have been correctly read by the character reader, the sum in the adder 27 must be zero at the end of the read-in phase of the error detection and correction operation and no uncertainty or failure conditions can have been detected. An AND block 70 receives the signal over conductor 71 from AND block 68 representing the zero sum condition in the adder at selected sampling times and the signals from the inverters 72 and 73. The inverter 72 receives its input from the set output conductor of latch 50, and the signal from this inverter is at the binary one level until a failure is detected in a character group. The inverter 73 is associated with the set output conductor of a latch 74 which is set by the first uncertainty signal provided by the two or more signal detector 42 on conductor 43. The inverter 73 provides an input to AND block 70 which remains at the binary one level until the first uncertainty condition in a character group is detected. The remaining input to AND block 70 in the gating signal RG0 which occurs at the end of the first or read-in phase of the error detection and correction operation. An output signal from AND block 70 indicates that an entire character group has been correctly read by the character reader and is applied to the set input conductor of a latch 75. When latch 75 is energized, a signal is transmitted to the output device indicating that the binary representations of the characters in the output buffer are to be accepted without alteration or correction during the read-out phase of the error detection and correction operation. Latch 75 is de-energized by means of the DG timing signal which is applied to its reset input conductor.

The output buffer 26 performs a temporary storage function with respect to the binary representations of the recognized characters and the special binary code groups signifying uncertainty or failure character positions for a character group supplied to the inputs thereof via OR blocks 59. The output buffer may comprise a shift register, a magnetic drum or any other suitable device well known in the art and receives various gating and reset signals to synchronize the operation thereof with respect to the other components of the error detection and correction apparatus. One of the signals applied to the output buffer is the reset signal DG which conditions the same to receive data during the read-in phase. Another control signal is the signal RG4 which is at the binary one level (see FIGURE 5 of the drawings) during a part of the read-out phase, which follows the read-in and uncertainty correction phases of the error detection and correction operation. The latter signal causes the information in the output buffer to appear on data conductors 79 in the order in which it was introduced into the buffer.

Each of the data conductors 79 is connected with an input terminal of the associated one of four AND blocks 80. The other input to each of the AND blocks 80 comes from an inverter 81. The inverter is connected by conductor 82 to an AND block 83 which is energized when the signals on all data conductors 79 are at the binary one level at the same time. The AND block 83 provides a means for detecting the special binary code groups (1111) representing failure or uncertainty character positions in a character group. The AND blocks 80 can be enabled at any time during the read-out phase by the binary representations corresponding to recognized characters of a group, and these binary representations are transmitted over conductors 84 to output OR blocks 85. The special code groups marking failure or uncertainty character locations are not passed to OR blocks 85 since AND block 83 detects and provides a signal in response to these special code groups.

One error condition which is corrected by the error detection and correction apparatus of the present invention is the occurrence of a single failure in a character group. Each of the four AND blocks 66 (see FIGURE 4*b*) receives not only the signals appearing on one of the data conductors 65 extending from the complementing network 29 but also the signal on conductor 86 representing a failure, the signal from inverter 73 indicating an uncertainty condition has not been detected and a gating signal RG0 which occurs at the end of the read-in phase of an error detection and correction operation. When all of these gating conditions exist, the binary signals from the complementing network are stored in four latches 88. The latches 88 are each connected to provide signals to an associated AND block 89 which also receives the signal supplied over conductor 82 from AND block 83 indicating the detection of the special code group and the read-out gating signal RG1. The arrangement is such that when a reject signal has not occurred (OR block 54 has not been energized), a character group having a single failure therein is corrected by supplying the information in the output buffer corresponding to the recognized characters to the output device via OR blocks 85 and inserting at the proper time in the train of information the binary representation of the missing character as determined by the combined operation of the binary adder 27 and complementing network 29.

The portion of the error detection and correction apparatus thus far described is capable of correcting a character group which is incomplete because the character reader has been unable to identify one of the characters of the group. In essence, the sum remaining in the adder after the recognized characters of the group have been supplied to the correction apparatus is complemented with respect to the selected numeric modulus of the checking scheme to obtain the binary representation corresponding to the unrecognized character. The apparatus is also capable of correcting multiple uncertainties in a character group in a manner which will now be explained.

Figure 4D:
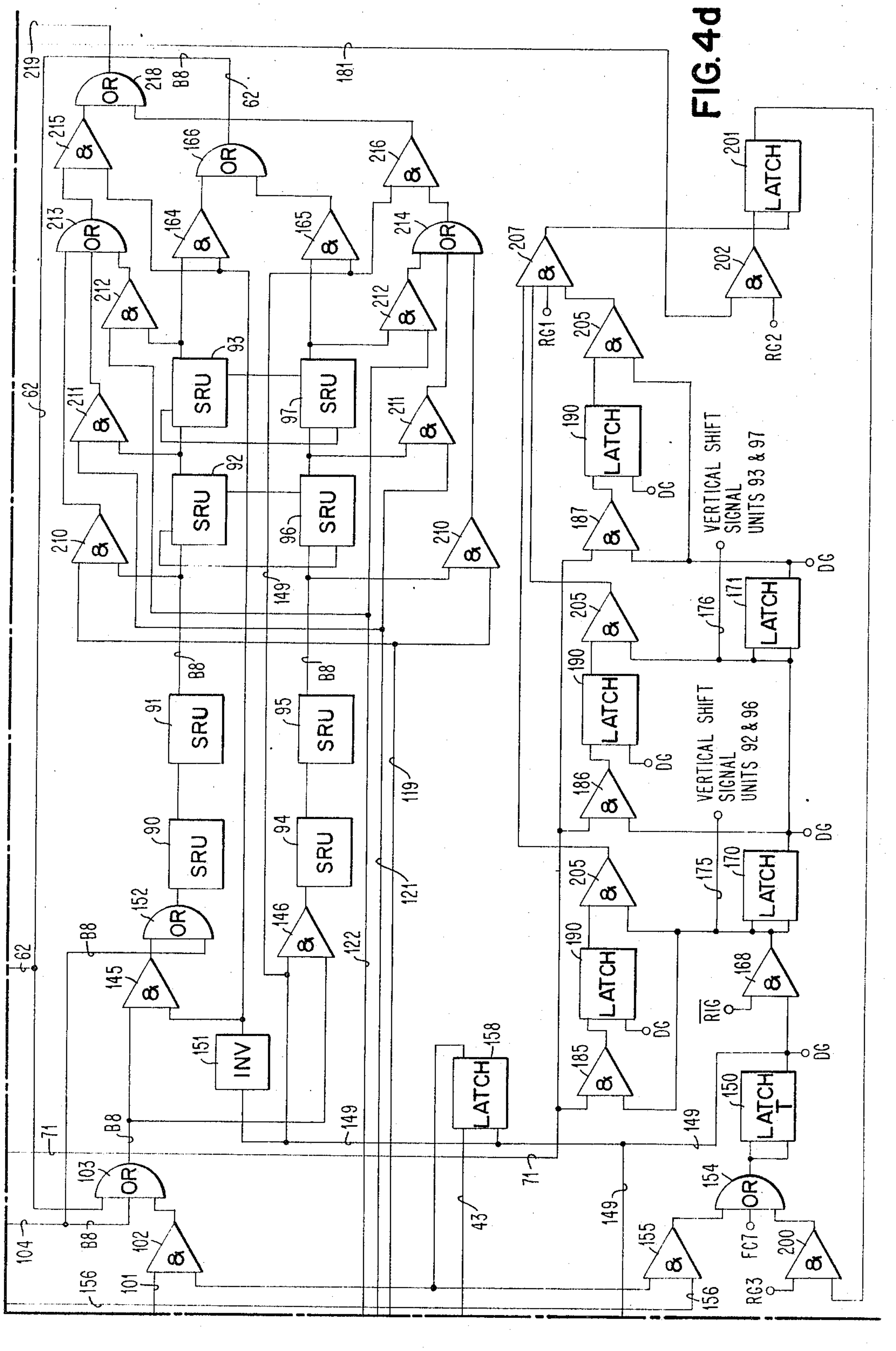

The uncertainty buffer 30 is shown in FIG. 4*d* of the drawings to comprise a plurality of shift register units 90–97 which are arranged to define a two dimensional shift register matrix. The shift register units 90–93 are connected in series relation to provide a first horizontal row along which information is propagated. In a similar manner, the shift register units 94, 95, 96, and 97 are connected to provide a second horizontal row of binary storage devices. The adjacent pairs of shift register units 92–96 and 93–97 in the columnar direction are interconnected so that the information in these pairs can be circulated.

Each of the shift register units 90–97 comprises a bistable storage device or latch provided with input gating so that information can be introduced therein and shifted in the desired direction to the adjacent shift register unit at the proper time. The construction and operation of the individual shift register units will be described in detail with reference to FIGURE 6 of the drawings in a following portion of the specification. It is sufficient for the present to understand that each shift register unit is capable of receiving, storing, and transferring to an adjacent shift register unit under the control of appropriate timing and shrift signals a binary bit of information. The uncertainty buffer is illustrated in connection with only one (B3) of the four bits of information comprising a binary representation of a character, but it will be apparent that four of the shift register units would be employed for each of the shift register units 90–97 shown in the drawings.

In general, the binary signals corresponding to the uncertainty characters for each uncertainty character position of a character group read by the character reader are routed to the uncertainty buffer 30 during the read-in phase of an error detection and correction operation. The information corresponding to the first two uncertainty characters for the first uncertainty character position or condition is initially stored in shift register units 90 and 94. The signals corresponding to the first two uncertainty characters for the second uncertainty character position or condition of the character group are then introduced into shift register units 90 and 94 while the uncertainty character information for the first uncertainty condition is transferred to shift register units 91 and 95. If a third uncertainty condition in the character group is detected, the information corresponding to these uncertainty characters is stored in shift register units 90 and 94 while the previously introduced uncertainty character information is shifted in the horizontal direction to adjacent columnar pairs of the shift register units. At the end of the read-in phase, the binary sum in the adder is supplied to and stored in the shift register units 90 and 94. Thereafter, each possible combination of the information in the uncertainty buffer is supplied to the adder to determine which, if any, of the possible combinations satisfies the arithmetical checking formula.

The number of uncertainty cycles during the uncertainty correction phase of an error detection and correction operation depends on the number of uncertainty conditions existing in a character group. If only one of the possible combinations of the uncertainty and sum information satisfies the arithmetical checking formula, the character group can be corrected. The binary representations of the correct characters are entered into the train of information going from the output buffer to the output device at the proper uncertainty character locations during the read-out phase. The error detection and correction apparatus shown in the illustrated embodiment is capable of correcting a character group having a maximum of three uncertainty character positions and of storing information corresponding to two uncertainty characters for each uncertainty character position. However, as will be hereinafter more fully apparent, the uncertainty buffer 30 may be expanded in either the row or columnar direction by the addition of more shift register units to accommodate more uncertainty information.

The data signals on conductors 41 leading from the coding network 25 are supplied to four AND blocks 100 (see FIGURE 4*a*) where they are gated with the signals on conductor 43 leading from the two or more signal detector 42. The AND blocks 100 pass the binary representations corresponding to the uncertainty characters over conductors 101 whenever an uncertainty occurs during the read-in phase of an error detection and correction operation. The uncertainty signal on conductor 43 remains at the binary one level for each uncertainty condition while all of the character identify output conductors 24 leading from the character reader 23 are being sampled in a sequential manner by the latches 36.

The conductors 101 extend to AND blocks 102 which supply data signals to OR blocks 103 forming a portion of the input gating means for the uncertainty buffer 30. For each uncertainty character position occurring in a character group, the binary signals for the first uncertainty character are initially introduced into shift register units 94, and the signals for the second uncertainty character are initially supplied to the shift register units 90 during the read-in phase of an error detection and correction operation. Another set of inputs to the OR blocks 103 is provided over conductors 104 extending from AND blocks 105. The four AND blocks 105 gate the binary signals representing the sum in the parallel binary adder 27 with the timing signal RG0 which occurs at the end of the read-in phase. The binary number in the adder representing the sum after the correctly read characters of a character group have been supplied thereto is stored in the shift register units 90 and 94. During each of the uncertainty cycles, a possible combination of the character and sum information in the uncertainty buffer is supplied to the binary adder and also to OR blocks 103 over conductors 62 whereby the uncertainty buffer defines a circulating memory or storage device.

The reading in and transferring of data from the uncertainty buffer is accomplished under the control of shift and readout control circuits 31. A counting chain comprising latches 110–113 (FIGURE 4*c*) receives and accumulates the pulses appearing on conductor 43 whenever uncertainty conditions occur during the read-in phase of an error detection and correction operation. A latch 114 is initially in its reset state and has its reset output conductor connected via delay device 115 to an input of AND block 116. The other input to AND block 116 is the conductor 43. The first pulse on conductor 43 representing the first uncertainty character position in a character group causes the latches 114 and 110 to be set. The set output conductor of latch 110 goes to the binary one level so that AND block 118 supplying an input to the set input conductor of latch 111 can be enabled by the next and second uncertainty signal on conductor 43. It will be noted that latch 110 is set only in response to the first uncertainty signal on conductor 43 since the latch 114 is set by this signal and a short time thereafter the signal from delay device 115 goes to and remains at the binary zero level. The signal at the binary one level on the set output conductor 119 of latch 110 indicates that one and only one uncertainty condition has been detected during the read-in phase.

The second uncertainty signal on conductor 43 energizes AND lock 118 by way of delay device 115 whereby latch 111 is set and latch 110 is reset via a feedback path comprising OR block 120. The signal on set output conductor 121 of latch 111 indicates that two and only two uncertainties have been detected during the read-in phase. In a similar manner, the set output conductor 122 of latch 112 goes to the binary one level when three uncertainty conditions occur in a single character group. Latch 112 is reset and latch 113 is set by the detection of the fourth uncertainty condition in a character group as represented by the fourth pulse on conductor 43. A signal on set output conductor 123 of latch 113 is employed to reject the entire character group and indicates that the output device is not to accept the information from the error detection and correction apparatus. As mentioned previously, the uncertainty buffer in the illustrated embodiment has a capacity to store the uncertainty information corresponding to three uncertainty character positions and if more than three uncertainty conditions exist in a single character group, this is an error condition which cannot be corrected in the present embodiment. The latches 110–114 are all reset to their initial states prior to an error detection and correction operation by the reset signal DG.

Under the maximum correctable multiple uncertainty error conditions of three uncertainty character positions in a character group, there are eight possible combinations of uncertainty character and sum information which must be examined to determine if one or more of these combinations cause the character group to satisfy the arithmetical checking formula. For control purposes, there is provided a pulse source, not shown, which produces and applies pulses PP to terminal 125. Eight pulses occur during each error detection and correction operation. The pulses PP at terminal 125 are shown in FIGURE 5 of the drawings and the first pulse occurs at the end of the read-in phase after the number of uncertainty conditions has been counted and recorded by latches 110–113.

The pulses appearing at terminal 125 are supplied via a delay device 126 to a binary counting chain comprising latches 127–130. The pulses from delay device 126 are applied to both the set and reset input conductors of the latch 127. The reset output conductors of latches 127, 128, and 129 provide the input signals to the set and reset input terminals of latches 128, 129, and 130, respectively. All of the latches of the counting chain are reset at the beginning of an error detection and correction operation by the reset pulse DG applied to their reset output conductors. The first pulse causes the latch 127 to switch to its set state; the second pulse resets latch 127 which causes latch 128 to be set; the third pulse sets latch 127; the fourth pulse resets latch 127 which in turn resets latch 128 and causes latch 129 to be set; etc. The arrangement is such that signals appear on the set output conductors 131, 132, and 133 of the latches 128, 129, and 130 after the occurrence of the second, fourth and eighth pulses at terminal 125. Each of these set output conductors leads to one of the AND blocks 134–136 which also receive the signals on the set output conductors 119, 121, and 122 of latches 110–112, respectively.

The AND blocks 134–136 provide inputs to OR block 138 which in turn is connected to the set input conductor of latch 139. The reset output conductor of latch 139 and the pulses appearing at terminal 125 are combined in AND block 140 whose output signals are supplied over conductor 141 to series connected delay devices 142 whose outputs define the sequential timing signals FC1–FC7. The signal on conductor 141 is the timing signal FC0. All of these timing signals are depicted in FIGURE 5 of the drawings. The number of pulses produced on conductor 141 and the number of series of the timing signals FC0–FC7 occurring during a particular error detection and correction operation are dependent on the number of uncertainties detected in a character group during the read-in phase in the manner set forth in the following table:

| No. of uncertainties Per character group: | No. of pulses on series FC0–FC7 |
|---|---|
| 0 | 1 |
| 1 | 2 |
| 2 | 4 |
| 3 | 8 |
| More than 3 | 1 |

For example, if two uncertainties occur in a character group, the latch 111 is set and pulses PP from terminal 125 appear on conductor 141 and produce the series of timing signals FC0–FC7 until the delayed fourth pulse from terminal 125 sets latch 129, enables AND block 135, sets latch 139 and de-energizes AND block 140. Latch 139 is reset to its initial state prior to a detection and correction operation by the timing signal DG.

As previously mentioned, during the read-in phase of an error detection and correction operation, the uncertainty and sum information is introduced into uncertainty buffer 30. Each of the four OR blocks 103 provides an input signal to a pair of AND blocks 145 and 146. The remaining input to each of the AND blocks 146 is the signal appearing on the reset output conductor 149 of a latch 150. This signal is also supplied to an inverter 151, and the inverted signal is supplied to the AND blocks 145. The output conductors of AND blocks 146 are connected to shift register units 94 while the data signals from AND blocks 145 are applied to shift register units 90 via OR blocks 152. The other inputs to the OR blocks 152 are provided by conductors 104 leading from AND blocks 105 which supply binary signals corresponding to the sum remaining in the adder at the end of the read-in phase of an error detection and correction operation. In essence, the uncertainty and sum information coming from OR blocks 103 is introduced into shift register units 90 or 94 depending on the state of latch 150.

The latch 150 is connected as a binary counting element and changes its state on the trailing edges of signals supplied to the set and reset input terminals thereof by OR block 154. During the read-in phase, the signals to OR block 154 are those supplied from AND block 155 which gates signals appearing on conductor 156 leading from AND block 157 with the signals on the set output conductor of a latch 158. The set output conductor of latch 158 also provides the remaining inputs to AND blocks 102. The AND block 157 (see FIGURE 4*a*) is energized each time an uncertainty signal is present on conductor 43, and an output signal from OR block 159 indicates that one of the uncertainty characters is being sampled. The latch 150 is initially in its reset state due to the application of the reset pulse DG to the reset output terminal thereof.

During the read-in phase of an error detection and correction operation, the detection of an uncertainty condition by two or more signal detector 42 causes latch 158 to be set so that signals at the binary one level are supplied to AND blocks 102 and 155. When the first uncertainty character for the uncertainty condition occurs, AND block 157 supplies a signal via conductor 156 to the latch 150. The binary digits corresponding to the first uncertainty character are supplied via AND blocks 100, conductors 101, AND blocks 102, OR blocks 103, and AND blocks 146 to the shift register units 94 since the AND blocks 146 are properly conditioned at this time. The trailing edge of the signal on conductor 156 causes latch 150 to switch its state so that when the second uncertainty character for this uncertainty condition occurs, the binary signals representing the uncertainty character are supplied to shift register units 90 via AND blocks 100, conductors 101, AND blocks 102, OR blocks 103, AND blocks 145, and OR blocks 152 since the signal from inverter 151 is at the binary one level at this time. The trailing edge of the second signal on the conductor 156 for the uncertainty condition switches the latch 150 to its reset state.

When latch 150 is reset, a signal is produced which resets the latch 158 so that the AND blocks 102 and 155 cannot thereafter be energized in response to information corresponding to a third uncertainty character for the first uncertainty condition. Such an arrangement is necessary since the uncertainty buffer comprises only two horizontal rows of shift register units. However, the uncertainty buffer can be expanded to include more rows whereby the same will accept and store information for as many uncertainty characters as desired for any one uncertainty condition. It should be noted that in a very large percentage of the uncertainty conditions there will be only two uncertainty characters, and even in the case where there are three uncertainty characters, the probabilities are that the character group can be corrected using the information corresponding to only two of these uncertainty characters.

The resetting of latch 150 also produces a signal which is applied via conductor 149 and AND block 160 to OR block 161 and defines a shift pulse on conductor 162 that causes the information in the shift register units 90 and 94 to be advanced to shift register units 91 and 95. The other input to AND block 160 is a gating signal RIG (see FIGURE 5 of the drawings) which remains at the positive or binary one level throughout the read-in phase of an error detection and correction operation.

After the first uncertainty signal has occurred, information corresponding to the first and second uncertainty characters is stored in shift register units 95 and 91. The next or second uncertainty condition detected in a character group sets latch 158 so that information corresponding to two uncertainty characters is stored in shift register units 90 and 94 under the control of latch 150. A shift signal on conductor 162 causes the information corresponding to the uncertainty characters associated with the first uncertainty character position to be transferred to shift register units 92 and 96, and the information corresponding to the uncertainty characters associated with the second uncertainty character position to be transferred to shift register units 91 and 95. The detection of the third uncertainty condition in a character group routes the information corresponding to the uncertainty characters to the uncertainty buffer and is shifted to the right. During the read-in phase of the error detection and correction operation, the counter comprising latches 110–113 is counting the number of uncertainty signals and provides an output signal corresponding thereto as previously explained.

The sum remaining in the binary adder 27 after binary signals corresponding to all the recognized characters of the character group have been supplied thereto is sampled by the gating signal RG0 supplied to AND blocks 105. This sum information is entered into the shift register units 90 via conductors 104 and OR blocks 152 and into the shift register units 94 via conductors 104, OR blocks 103, and AND blocks 146 since latch 150 is in its reset state at this time. All information necessary for use during the uncertainty correction phase is now stored in the uncertainty buffer.

The last shift register units 93 and 97 of the horizontal rows thereof provide input signals to series of AND blocks 164 and 165, respectively. The other inputs to the AND blocks 164 are the signals supplied from the inverter 151 while the reset output conductor 149 of latch 150 is connected to AND blocks 165. The signals from AND blocks 164 and 165 are combined in OR blocks 166. The information in the top and bottom rows of the shift register units can be read out in a sequential manner under control of latch 150 and applied via conductors 62 to the binary adder 27 through OR blocks 61 and to OR blocks 103 for reintroduction into the uncertainty buffer.

During the read-in phase of an error detection and correction operation, the inverse of the read-in gating signal ($\overline{RIG}$) is supplied to an input terminal of an AND block 168. When the read-in gating signal goes to the binary zero level at the end of the read-in phase, the reset output conductor of latch 150 is effectively connected to the set and reset input conductors of latch 170. The latch 170 in turn has its reset output conductor connected with the set and reset input conductors of latch 171. In essence, the latches 150, 170, and 171 define a binary counting chain during the uncertainty correction and read-out phases of an error detection and correction operation. The timing pulses FC7 are supplied to the binary counter chain via OR block 154. The number of the pulses FC7 and the number of uncertainty cycles occurring during an uncertainty correction phase will depend on the number of uncertainty character positions detected in a character group.

The output signals from OR block 161 appearing on conductor 162 define shift pulses which advance the information in the shift register units 90–97 in the horizontal or row direction. The signals FC2 through FC5 are applied to the OR block 161 during each uncertainty cycle of the uncertainty correction phase, and these four pulses occur before the pulse FC7 is applied via OR block 154 to the latch 150.

At the beginning of an uncertainty correction phase, the latch 150 is in its reset state and pulses FC2–FC5 cause the uncertainty character and sum information in the shift register units 94, 95, 96, and 97 to be read out through AND blocks 165 and OR blocks 166. This information is applied over data conductors 62 to the binary adder 27 which has previously been reset to zero by the signal FC1. The information is also circulated back into the uncertainty buffer through OR blocks 103 and AND blocks 146. In this manner one possible combination of the sum and uncertainty character information is supplied to the adder during the first uncertainty cycle. After the information has been reintroduced back into the uncertainty buffer, the signal FC7 occurs, and its trailing edge sets latch 150 so that AND blocks 164 and 145 are conditioned for read-out and read-in, respectively.

The next series of pulses FC2–FC5 causes the information in shift register units 90–93 to be supplied to the adder and reintroduced into the uncertainty buffer during the second uncertainty cycle of an uncertainty correction phase. The pulse FC7 returns latch 150 to its reset state, and AND block 168 is energized to set the latch 170 and produce a vertical shift signal on conductor 175. This shift signal is supplied to the shift register units 92 and 96 and causes the uncertainty character information therein to be circulated. The operation of the various horizontal and vertical shifting signals in circulating information between the shift register units will be hereinafter more fully explained in connection with FIGURE 6 of the drawings. The return of latch 150 to its reset state conditions AND blocks 146 and 165 so that information in the horizontal row provided by shift register units 94–97 is supplied to the adder when the next series of four advance pulses appear on conductor 162.

During the third and fourth uncertainty cycles of an uncertainty correction phase, two more possible combinations of the sum and uncertainty information are supplied to the binary adder. The trailing edge of pulse FC7 occurring in the fourth uncertainty cycle resets latch 150, resets latch 170, and sets latch 171. This causes the signal on conductor 175 to again go to the binary one level, and the signal on conductor 176 also goes to the binary one level. The conductor 176 supplies vertical shift signals to the shift register units 93 and 97. At this time the uncertainty information in the vertical pairs of shift register units 92, 96 and 93, 97 is circulated. This allows two further combinations of the sum and uncertainty character information to be supplied to the adder during the fifth and sixth uncertainty cycles. The FC7 signal in the sixth uncertainty cycle causes the signal on conductor 175 to go to the binary one level since latch 170 is set at this time, and the information in shift register units 92 and 96 is again circulated.

The remaining two possible combinations of the sum and uncertainty character information are supplied to the adder and circulated back to the uncertainty buffer during uncertainty cycles seven and eight. The eighth FC7 timing pulse causes all of the latches 150, 170, and 171 to be reset so that the information in shift register units 92, 96, and 93, 97 is again circulated. At the end of eight uncertainty cycles, the uncertainty and sum information is stored in the uncertainty buffer in exactly the same order as this information was stored therein at the end of the read-in phase. The latches 150, 170, and 171 are also in their initial or reset conditions. All possible combinations of the uncertainty and sum information have been supplied to the adder. Eight uncertainty cycles are employed when three uncertainty conditions occur in a single character group. However, as explained above, the number of times the series of timing signals FC0–FC7 are generated, and the number of uncertainty cycles during the uncertainty correction phase of an error detection and correction operation depends on the number of uncertainty conditions detected in a character group.

After each possible combination of the uncertainty and sum information has been supplied to the adder, it is necessary to determine whether the sum in the adder is zero. A zero sum in the adder signifies that a combination satisfied the arithmetical checking formula. If the sum in the adder is zero at the end of more than one uncertainty cycle, the character group is rejected since it cannot be corrected with certainty. Also, it is necessary to provide a means for storing an indication of which combination satisfied the arithmetical checking formula so that the information in the uncertainty buffer can be placed in an order which allows the binary representations of the selected uncertainty characters to be gated out at the proper times during the read-out phase of an error detection and correction operation.

The sampling of the adder after a possible combination of the sum and uncertainty information has been supplied thereto is accomplished by AND block 68 when the pulse FC6 occurs. The set input conductor of latch 179 receives the output signals from AND block 68. An AND block 180 gates the signals from AND block 68 with the signal on the set output conductor 181 of latch 179 and provides signals to the set input terminal of latch 184. Latches 179 and 184 are reset by the signals DG and RG0 which occur prior to an error detection and correction operation and at the end of the read-in phase, respectively. The detection of a first zero condition in the adder during the uncertainty correction phase will set latch 179 and condition AND block 180 so that if a second zero condition occurs during the same uncertainty correction phase, the latch 184 provides a reject signal to the output device indicating that information coming from the error detection and correction apparatus for the character group is not to be accepted.

The conductor 71 extending from the AND block 68 is connected to three AND blocks 185, 186, and 187 associated with the latches 150, 170, and 171 forming the binary counting chain. The other inputs to AND blocks 186 and 187 are the signals on the reset output conductors of latches 170 and 171, respectively, while the other input to AND block 185 is the output signal from AND block 168. The first zero condition in the adder after the uncertainty and sum information has been supplied to the adder during any uncertainty cycle of the uncertainty correction phase will cause the conditions of the latches 150, 170, and 171 at that time to be stored in three latches 190. Thus at the end of the uncertainty correction phase, all possible combinations of the sum and uncertainty information have been supplied to the adder, and an indication corresponding to the combination which satisfied the arithmetical checking formula is stored in the latches 190.

During the read-out phase of an error detection and correction operation, the information in the uncertainty buffer must be returned to the order which satisfied the arithmetical checking formula and the information corresponding to the selected uncertainty characters gated at the proper times into the stream of information going from the output buffer to the output device. The first step in the read-out phase is accomplished by the pulses RG3 which are supplied to the latch 150 via AND block 200 and OR block 154. The other input to AND block 200 is defined by the set output conductor of latch 201. This latch is set in response to the output signal of AND block 202 which receives the gating signal RG2 and the signal on conductor 181 extending from the latch 179. The latch 201 is set at the beginning of the read-out phase of an error detection and correction operation providing a zero sum condition in the adder has been detected during at least one uncertainty cycle.

The setting of latch 201 allows the pulses RG3 to advance the count in the counter defined by the latches 150, 170, 171. As soon as the count in this counter matches the count previously stored in latches 190, three AND blocks 205 are simultaneously energized. Energization of AND blocks 205 satisfies the input conditions for AND block 207 since the read-out gating signal RG1 is at the binary one level. The AND block 207 provides an output signal which resets the latch 201. The arrangement is such that the latch 201 is in its set state only for a time interval which allows the passage of the correct number of RG3 pulses to the counter comprising latches 150, 170, and 171 to return these latches to the states they assumed when the zero condition in the adder was detected during the uncertainty correction phase. The sum and uncertainty information in the uncertainty buffer is in the order which it had assumed during the uncertainty cycle when the zero condition of the adder occurred.

To effect read-out of the information corresponding to the selected uncertainty characters, the outputs of the shift register units 91 and 95 are each supplied to a series of AND blocks 210. The AND blocks 210 also receive the signal on conductor 119 which is at the binary one level if only one uncertainty was detected in a character group. In a similar manner, the data signals from shift register units 92 and 96 are supplied to a series of AND blocks 211 with a signal indicating two uncertainties in the character group on conductor 121, and the data signals from shift register units 93 and 97 are gated with the signal indicating three uncertainties in the character group on conductor 122 in AND blocks 212. The outputs of each group of AND blocks 210, 211, and 212 associated with the upper row of shift register units are combined in OR blocks 213 while OR blocks 214 perform the same function with respect to the groups of AND blocks 210, 211, and 212 receiving input signals from the lower row of shift register units. The OR blocks 213 supply signals to AND blocks 215 which also receive signals from inverter 151. Four AND blocks 216 receive the data signals from OR blocks 214 and the control signal on conductor 149 extending from the reset output conductor of latch 150. The outputs of each pair of AND blocks 215 and 216 are combined in an OR block 218. The data signals from OR blocks 218 are transmitted over conductors 219 to AND blocks 220 that also receive the gating signal RG4. The AND blocks 220 provide data input signals to the OR blocks 85.

In essence, the above-described circuitry provides various circuit paths for gating the information in the uncertainty buffer representing the selected uncertainty characters which cause the character group to satisfy the arithmetical checking formula. The particular circuit paths employed in a given error detection and correction operation depend on the number of uncertainty character positons in the character group.

After the latches 150, 170, and 171 have assumed the states which caused the zero condition in the adder during an uncertainty cycle, the AND blocks 215 or 216 are conditioned for energization depending on the state of latch 150. The signal RG4 goes to the binary one lvel, and the information in the output buffer 26 corresponding to the recognized characters of a character group are transmitted to the output device via OR blocks 85. Each time the AND block 83 senses the special code group corresponding to an uncertainty character position, a signal is produced on conductor 82 and applied to AND block 225 (see FIGURE 4*c*). The AND block 225 is energized, and this produces a shift pulse on conductor 162 which causes the information corresponding to the selected uncertainty character to be supplied via OR blocks 218, conductors 219, and AND blocks 220 to the OR blocks 85 for transmission to the output device. The arrangement is such that the information representing the selected uncertainty characters are entered into the stream of information coming from the output buffer in the proper order and at times corresponding to the uncertainty character positions.

Referring now to FIGURE 6 of the drawings, there is shown a schematic circuit diagram of the shift register unit 92. A latch 230 has its set input terminal connected to the output terminal of the previous horizontally adjacent shift register 91 unit via delay device 231, OR block 232, and AND block 233. The remaining input to AND block 233 is provided by the horizontal advance pulses appearing on conductor 234 which are obtained by combining the signals from AND blocks 235 and 236 in OR block 237. The AND block 235 receives the signals from inverter 151, the signals on conductor 162, and the gating signal $\overline{\text{RIG}}$. The AND block 236 passes the pulses on conductor 162 during the read-in phase when the signal RIG is at the binary one level. The advance pulses on conductor 234 are also supplied to an OR block 238 which is connected to the reset input terminal of latch 230. The set output terminal of latch 230 is connected via delay device 239 with the following horizontally adjacent shift register unit 93. The vertical shift pulses on conductor 175 are supplied to OR block 238 and also to an AND block 240 which receives the data signals from the vertically adjacent shift register unit 96. The output signals from AND block 240 define the remaining input to OR block 232. The latch 230 is initially reset by the DG signal applied to the reset input terminal thereof by way of OR block 238.

If a latch in the shift register unit 91 is set to represent a binary one and it is desired to shift the information to shift register unit 92, and advance pulse is produced on conductor 234 which resets latch 230 and lets the binary bit of information previously stored in shift register unit 91 pass through AND block 233. This information is delayed by delay device 231 until the advance pulse has disappeared and latch 230 is set. At the same time, the binary information in shift register unit 92 is transferred to shift register unit 93. Vertical shift pulses on the conductor 175 will cause binary information to be circulated between shift register units 92 and 96 in a similar manner. While only shift register unit 92 has been shown in detail, all of the shift register units 90–97 are of similar construction. The shift register units 90–93 all receive the advance pulses appearing on conductor 234 and similar circuitry responsive to the signals on conductors 149 and 162 and the gating signal RIG and $\overline{\text{RIG}}$ would provide horizontal advance pulses to shift register units 94–97. As previously mentioned, each of the shift register units would comprise four latches and associated gating circuitry connected in parallel relation to receive, store, and transfer the binary sum and uncertainty information.

*Detecting multiple compensating substitutions and correcting multiple compensating uncertainties*

It has long been recognized in the art that a checking scheme employing a single redundant check digit cannot detect the error condition where multiple compensating substitutions occur in a character group. For example, in the character group 38649 shown in FIGURE 2 of the drawings, if the character 8 is recognized as the character 9 and the character 6 is recognized as the character 5, the resultant character group of 39549 which is in error will satisfy the arithmetical checking formula and be supplied to the output device. The sum of the character values of the recognized character group $$(3+9+5+4+9=30)$$

equals an integral multiple of the selected numeric modulus. Multiple, in this case two, compensating substitutions have occurred in the character group.

In the error detection and correction apparatus disclosed, a character group is rejected if two or more of the possible combinations of the sum and uncertainty character information satisfy the arithmetical checking formula due to the occurrence of multiple compensating uncertainties. For example, if the character group 38649 is read by the character reader and uncertainty characters 8 and 9 are indicated for the character 8 and the uncertainty characters 5 and 6 are indicated for the character 6, the character group could not be corrected. The modulus 10 sum of the correctly recognized characters is 6 since $3+4+9=16$, and the following combinations of sum and uncertainty character information are provided:

$$6+8+5=9$$
$$6+9+6=1$$
$$6+9+5=0$$
$$6+8+6=0$$

It will be noted that two of these combinations satisfy the arithmetical checking formula, and according to the operation of the apparatus set forth in the preceding section of the specification, the character group would be rejected.

For any character reader in a given application, it is possible to read a large volume of test characters to determine the probabilities that any read character is likely to be recognized as any other character of the character set to be recognized. Data can also be compiled as to what characters are most likely to be indicated when a particular character is read and an uncertainty condition exists. From this data, substitution and uncertainty probability matrices are constructed. An example of such a substitution matrix for a particular character reader is shown in the article entitled, "Linear Decision Functions With Application to Pattern Recognition," W. H. Highleyman, appearing on pages 1501–1514 of the June, 1962, issue of the "Proceedings of the Institute of Radio Engineers."

I have found that by examination of such matrices and careful selection of values for the characters to be checked, it is possible to significantly reduce the probabilities of multiple compensating substitutions which cannot be detected and multiple compensating uncertainties which cannot be corrected. For the purpose of providing a simple illustration, let it be assumed that a character reader will make only the following substitutions—a character 6 is sometimes recognized as a 5, and about as often, a character 8 is recognized as a 9. Of the character groups where combinations of characters may result in compensating errors, approximately one-half can be detected with the use of a single check character. For example, if two characters 6 or two characters 8 appear in the original character group, the checking formula will not be satisfied when the assumed multiple substitutions occur. The occurrence of two substitutions in character groups in which a 6 and a 8 caused the substitutions cannot be detected since these multiple substitutions are compensating. However, such undetectable substitutions can be detected by arbitrarily assigning the value 2 to the character 6. Such an assignment will result in the detection of all double substitution errors under the conditions outlined above and will result in a different redundant check character for a portion of the character groups.

Since each character 6 in a character group is to be considered as the character 2 and vice versa for checking purposes, the character group shown in FIGURE 2 will have a different check character. Again, the values of the account digits 8649 are added to determine the number required to make the sum of the values of the characters equal the selected numeric modulus or an integral modulus thereof. Thus, 8+2 (the substituted value for 6) +4+9 equals 23, and the check character is 7. The entire account number, including the redundant check character becomes 78649, and it appears on the document as shown in FIGURE 8 of the drawings.

In FIGURE 7 of the drawings, there is shown a coding network 25 of the type used in the apparatus of FIGURES 1–6 with certain modifications made thereto so that the error detection and correction apparatus can be employed with character groups wherein the check digit is calculated as disclosed in connection with FIGURE 8. Each of the character identifying output conductors 24 from the character reader 23 terminates at a terminal 250. The terminals 250 are connected by conductors 251 to terminals 252. The terminals 252 are interconnected with four OR blocks 254 in such a manner that binary numbers corresponding to the numbers appearing adjacent terminals 252 are produced on the data conductors 41 as set forth in the table appearing in column 8 of the specification. For the apparatus shown in FIGURES 1–6, the conductors 251 all extend directly between and bridge horizontally aligned pairs of the terminals 250 and 252. However, in order to detect multiple compensating substitutions for a character reader having the characteristics assumed above, the terminals 250 corresponding to the characters 2 and 6 are interconnected by conductors 251 with the terminals 252 corresponding to the characters 6 and 2, respectively. The character 6 is considered as the character 2 and vice versa within the confines of the error detection and correction apparatus.

When the account number 78649 is read correctly, the checking formula will be satisfied since 7+8+2 (substitute value for 6) +4+9 equals 30, which is an integral multiple of the selected numeric modulus. For the double substitution condition, the account number shown will be recognized by the character reader as 79549, since the characters 8 and 6 are recognized as the characters 5 and 9, respectively. The sum of the character values (7+9+5+4+9=34) does not equal the selected numeric modulus or an integral multiple thereof, and the normally compensating multiple substitutions are detected.

The above analysis can also be applied to show that multiple compensating uncertainty conditions can be corrected. Of course, a character reader may have more than two possible compensating substitutions or uncertainty conditions and not all of these can be detected or corrected. However, the probabilities of occurrence of compensating substitutions and uncertainties which cannot be detected or corrected can be substantially reduced by examination of the probability matrices and appropriate selection of values for the characters to be checked. It will be noted that the assignment of different values for the characters does not alter in any manner the operation of the character reader. Also the only change to the error detection and correction apparatus is the different interconnection made in the coding matrix.

*Conclusion*

It should now be apparent that the objects initially set forth have been accomplished. Of particular importance is the provision of error detection and correction apparatus wherein it is possible to correct a group of characters having a single check character associated therewith when one or more uncertainty conditions occur. Also apparatus has been disclosed for minimizing the occurrence of undetectable multiple compensating substitutions and correcting multiple compensating uncertainties. The combined error detection and correction apparatus is extremely versatile and greatly improves the reliability and accuracy of the data supplied from the character reader or a similar device to the output device.

The uncertainty buffer can be expanded in either the horizontal or vertical directions so that the apparatus can handle as many uncertainty conditions in a single character group and as many uncertainty characters for each uncertainty condition as is desired. The concept of supplying possible combinations of uncertainty information to the adder during the uncertainty cycles would still be employed. While the possible combinations represent sum and uncertainty character information in the illustrated embodiment, it would be possible to supply the recognized characters and combinations of the uncertainty characters to the adder during each uncertainty cycle. Further if only a limited number of rows of shift register units were provided in the shift register, it is possible to select which of the uncertainty characters for the most likely uncertainty conditions will be employed during the error correction phase. This is accomplished by changing the order of the character identifying output conductors extending from the character reader.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for:

(a) checking the accuracy of readings by character reading apparatus or the like of character groups each comprising a number of characters having assigned values and a single redundant check character whose assigned value causes a character group to satisfy an arithmetical checking formula; and (b) selectively completing incompletely read character groups wherein each of said incompletely read character groups has more than one uncertainty character position and the character reading apparatus provides at least two uncertainty characters for each uncertainty character position, comprising:

storage means for receiving and storing the signals representing the assigned values of the recognized characters of a character group and the signals representing the assigned values of at least two uncertainty characters for each uncertainty character position of said character group;

means for determining whether the assigned values of a group of characters supplied thereto satisfy said arithmetical checking formula; and means to supply representations of possible combinations of said assigned values of said recognized characters and said uncertainty characters from said storage means to said means for determining to determine which, if any, of said possible combinations satisfy said arithmetical checking formula.

2. Apparatus according to claim 1 further characterized by:

said values being assigned to said characters in accordance with the characteristics of said character reading apparatus to minimize the occurrence of multiple compensating substitutions in a character group.

3. Apparatus according to claim 1 further characterized by:

said values being assigned to said characters in accordance with the characteristics of said character reading apparatus to minimize the occurrence of multiple compensating uncertainties in a character group.

4. Apparatus for:

(a) checking the accuracy of readings by character reading apparatus of character groups each comprising a group of characters having assigned values and a single redundant check character whose assigned value causes a character group to satisfy an arithmetical checking formula; and (b) selectively completing incompletely read character groups wherein each of said incompletely read character groups has more than one uncertainty character position and the character reading apparatus provides at least two uncertainty characters for each uncertainty character position, comprising:

first storage means for receiving and storing the character identifying output signals from said character reading apparatus representing the assigned values of the recognized characters of a character group;

second storage means for receiving and storing the character identifying output signals from said character reading apparatus representing the assigned values of at least two uncertainty characters for each uncertainty character position of said character group;

means for determining whether the assigned values of a group of characters supplied thereto satisfies the arithmetical checking formula; and control means supplying representations of possible combinations of the assigned values of said recognized characters and said uncertainty characters from said first and said second storage means to said means for determining to determine which, if any, of said possible combinations satisfy said arithmetical checking formula.

5. Apparatus according to claim 4 further characterized by:

said second storage means comprises an uncertainty buffer having a plurality of storage stages arranged in a two dimensional matrix;

said matrix having at least a number of storage stages in one direction corresponding to the maximum number of uncertainty character positions that may occur in a correctable character group;

said matrix having at least a number of storage stages in another direction corresponding to the maximum number of uncertainty characters to be employed in a correction operation for each uncertainty character position;

circulating control means causing the circulation of the assigned values of the uncertainty characters stored in said uncertainty buffer between selected stages of said matrix in at least one of said directions, and means interconnecting said uncertainty buffer with said means for determining.

6 Apparatus according to claim 5 further characterized by:

said first storage means having a position of storage for each character position of a character group;

means to store the assigned signals corresponding to the recognized characters of a character group in their corresponding storage positions in said first storage means; and means to combine said assigned values of said recognized characters in said first storage means with the assigned values of said uncertainty characters in said uncertainty buffer which said means for determining has determined will cause said character group to satisfy said arithmetical checking formula.

7. Apparatus according to claim 6 further characterized by:

means to store a special code group in the storage positions of said first storage means corresponding to said uncertainty character positions of said character group;

means to detect the occurrence of said special code groups; and said control means being responsive to said means to detect.

8. Apparatus for checking the correctness of character groups provided by output apparatus wherein each character group comprises a number of characters and a redundant check character which causes the character group to satisfy an arithmetical checking formula comprising:

a plurality of character identifying output conductors extending from said output apparatus providing;

a coding means receiving the character identifying output signals on said conductors and assigning values to each of said characters for checking purposes; and said values being assigned to said characters in accordance with the characteristics of said output apparatus providing to minimize the occurrence of multiple compensating errors in said character groups which cannot be detected by said checking apparatus.

9. Apparatus according to claim 8 further characterized by:

means for selectively completing incomplete character groups wherein each of said incomplete character groups has at least one uncertainty character position and the apparatus provides at least two uncertainty characters for each uncertainty character position; and said means for completing comprising means for examining each possible combination of the assigned values of the recognized characters and the assigned values of the uncertainty character for an incomplete character group to determine which, if any, of said possible combinations satisfy said arithmetical checking formula.

10. Apparatus for checking the accuracy of readings by character reading apparatus of the like of character groups each comprising a number of characters and a redundant check character which causes the character group to satisfy an arithmetical checking formula comprising:

a plurality of character identifying output conductors extending from said character reading apparatus;

a coding means receiving character identifying signals from said conductors and assigning values to each of said characters for checking purposes; and said values being assigned to said characters in accordance with the characteristics of said character reading apparatus to minimize the occurrence of multiple compensating substitutions which cannot be detected by said checking apparatus.

References Cited by the Examiner

UNITED STATES PATENTS

| | | | |
|---|---|---|---|
| 3,054,988 | 9/1962 | Edwards et al. | 340—172.5 |
| 3,102,996 | 9/1963 | Hill et al. | 340—172.5 |
| 3,188,609 | 6/1965 | Harmon et al. | 340—146.1 |
| 3,200,372 | 8/1965 | Hamburgen | 340—146.1 |

MALCOLM A. MORRISON, *Primary Examiner.*

M. P. ALLEN, M. P. HARTMAN, *Assistant Examiners.*